US011161641B2

(12) United States Patent
Verbeeten

(10) Patent No.: US 11,161,641 B2
(45) Date of Patent: Nov. 2, 2021

(54) METHOD AND SYSTEM FOR FORMING SLEEVED CONTAINERS

(71) Applicant: Fuji Seal International, Inc., Osaka (JP)

(72) Inventor: Jacobus Andreas Verbeeten, Eindhoven (NL)

(73) Assignee: Fuji Seal International, Inc., Osaka (JP)

( * ) Notice: Subject to any disclaimer, the term of this patent is extended or adjusted under 35 U.S.C. 154(b) by 260 days.

(21) Appl. No.: 15/773,377

(22) PCT Filed: Nov. 16, 2016

(86) PCT No.: PCT/EP2016/077907
§ 371 (c)(1),
(2) Date: May 3, 2018

(87) PCT Pub. No.: WO2017/085149
PCT Pub. Date: May 26, 2017

(65) Prior Publication Data
US 2018/0319528 A1   Nov. 8, 2018

(30) Foreign Application Priority Data

Nov. 16, 2015   (NL) ...................................... 2015799

(51) Int. Cl.
*B65C 3/06*   (2006.01)
*B29C 63/00*   (2006.01)
(Continued)

(52) U.S. Cl.
CPC .......... *B65C 3/065* (2013.01); *B29C 63/0004* (2013.01); *B29C 63/423* (2013.01); *B29L 2031/7158* (2013.01)

(58) Field of Classification Search
CPC .... B65C 3/065; B29C 63/0004; B29C 63/423
See application file for complete search history.

(56) References Cited

U.S. PATENT DOCUMENTS

2007/0210040 A1* 9/2007 Sakamoto ............ B23K 26/082
219/121.63
2013/0284346 A1   10/2013 Koolhaas
(Continued)

FOREIGN PATENT DOCUMENTS

CN   203830905 U   *   9/2014
JP   3143457           7/1988
(Continued)

OTHER PUBLICATIONS

"Japanese Application No. 2018-525380 Reason for Refusal dated Aug. 2, 2019.", w English Translation, 16 pgs.
(Continued)

*Primary Examiner* — Jeffry H Aftergut
*Assistant Examiner* — Jaeyun Lee
(74) *Attorney, Agent, or Firm* — Schwegman Lundberg & Woessner, P.A.

(57) ABSTRACT

The present application relates to a system and method for forming sleeved containers. The method comprises conveying a row of containers, arranging sleeves around the containers being conveyed, attaching the sleeve to the container being conveyed by heat shrinking, removing a part of the sleeve, the removing comprising at least partially laser cutting a part out of the sleeve thereby causing the creation of a fume region containing fumes of sleeve material evaporated by the laser cutting and blowing air along the wall of the container, wherein the flow of air is directed towards the fume region to force the fumes to move away from the container.

20 Claims, 6 Drawing Sheets

Figure 1:
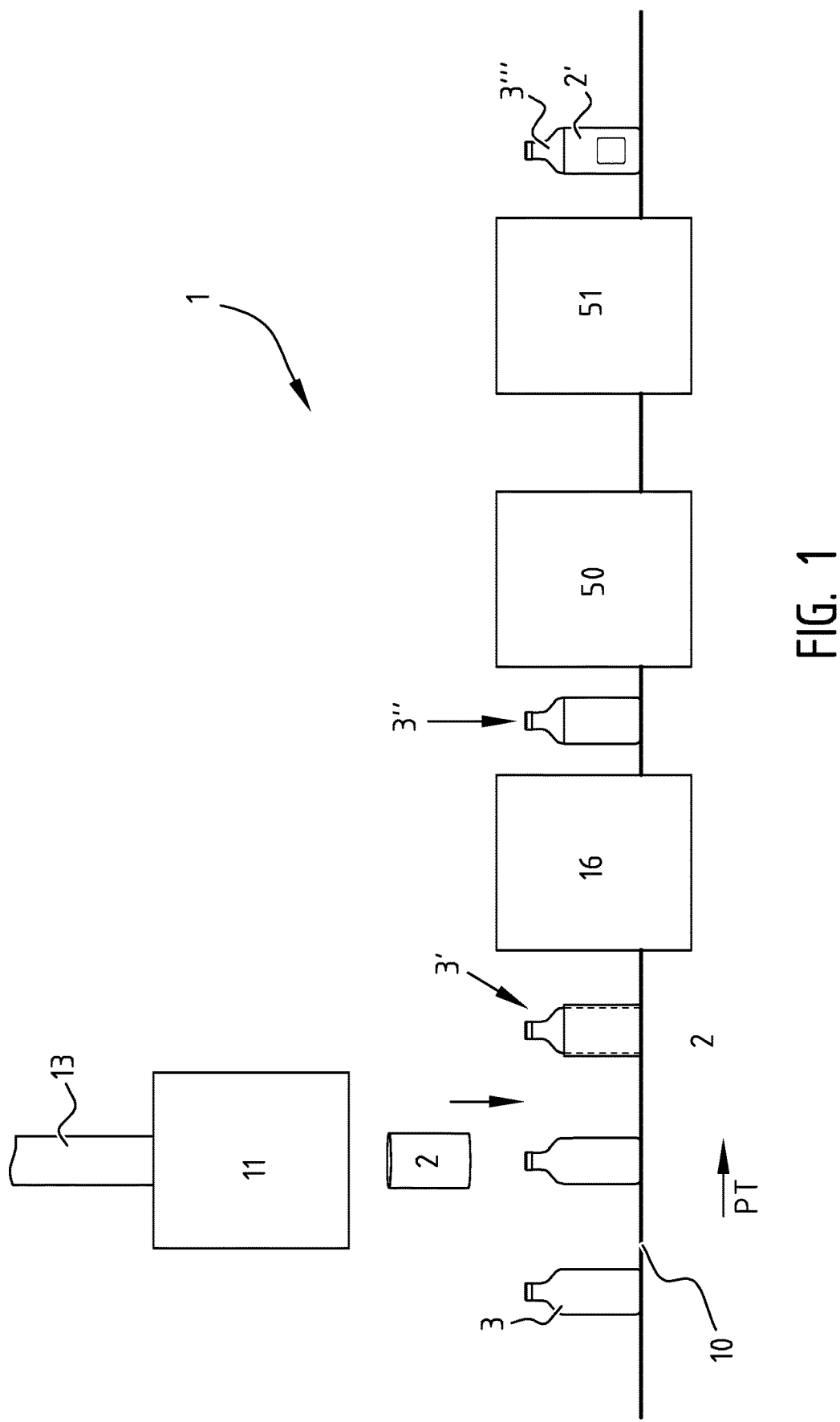

(51) Int. Cl.
　　　*B29C 63/42*　　　(2006.01)
　　　*B29L 31/00*　　　(2006.01)

(56) References Cited

U.S. PATENT DOCUMENTS

| | | |
|---|---|---|
| 2014/0290827 A1 | 10/2014 | Heeman |
| 2016/0114489 A1* | 4/2016 | Goudy .................. B65C 3/08 425/174.4 |
| 2016/0129712 A1* | 5/2016 | Yoshinaga ........... B41J 11/0085 347/101 |

FOREIGN PATENT DOCUMENTS

| | | |
|---|---|---|
| JP | 2001321979 | 11/2001 |
| WO | WO-2013070068 A1 | 5/2013 |
| WO | WO-2013070088 A1 | 5/2013 |
| WO | WO-2014006033 A1 | 1/2014 |

OTHER PUBLICATIONS

"International Application No. PCT/EP2016/077907, International Search Report dated Feb. 2, 2017", (dated Feb. 2, 2017), 3 pgs.
"International Application No. PCT/EP2016/077907, Written Opinion dated Feb. 2, 2017", (dated Feb. 2, 2017), 5 pgs.

\* cited by examiner

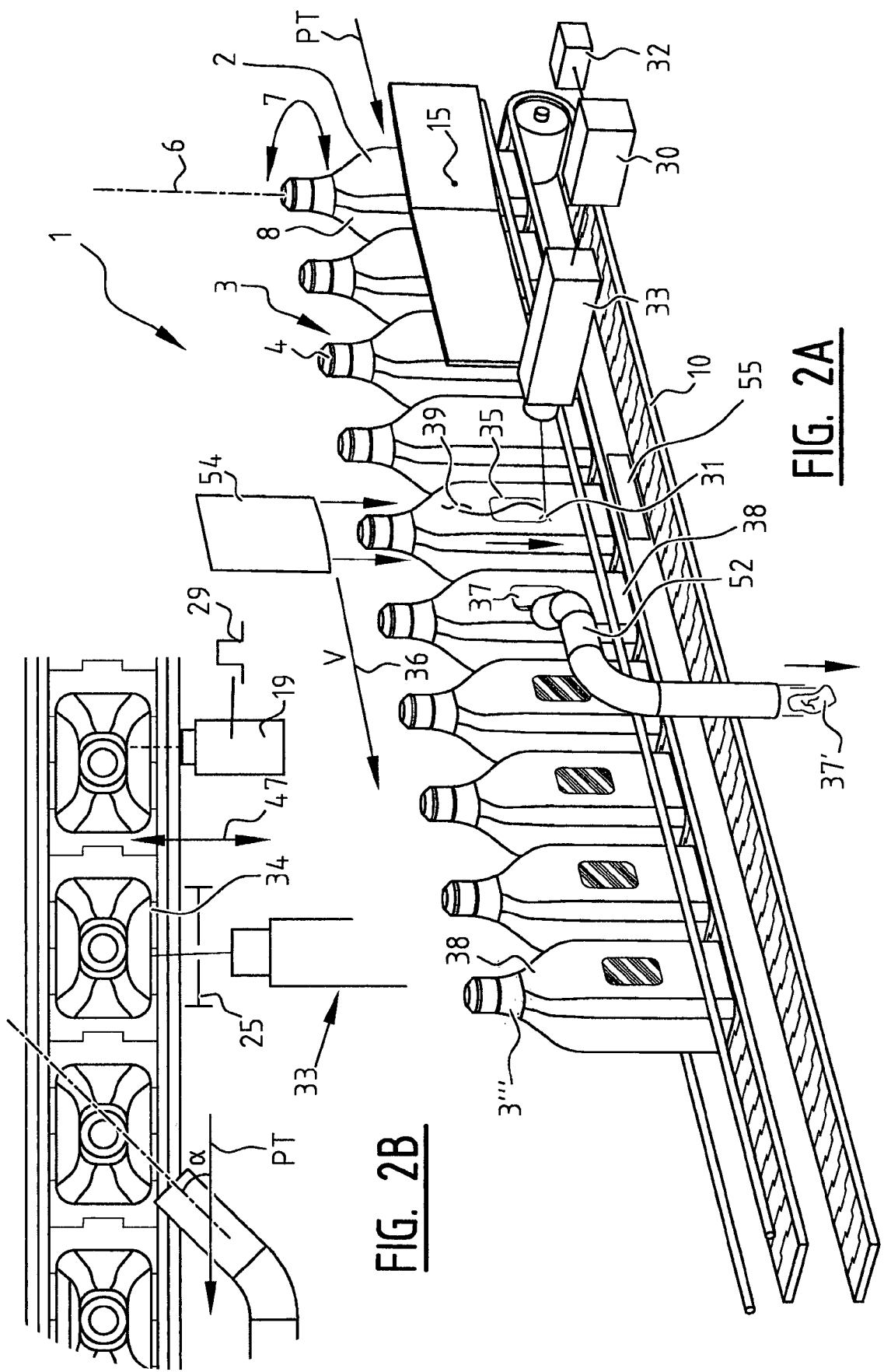

METHOD AND SYSTEM FOR FORMING SLEEVED CONTAINERS

PRIORITY APPLICATIONS

This application is a U.S. National Stage Filing under 35 U.S.C. 371 from International Application No. PCT/EP2016/077907, filed on Nov. 16, 2016, and published as WO2017/085149 on May 26, 2017, which claims the benefit of priority to Netherland's Application No. 2015799, filed on Nov. 16, 2015; the benefit of priority of each of which is hereby claimed herein, and which applications and publication are hereby incorporated herein by reference in their entirety.

The invention relates to a method and system for forming sleeved containers.

An example of a method and system for forming sleeved containers is described in WO 2013/070088 A1. The known method and system involve conveying a row of containers on a conveyor, arranging sleeves made of a tubular film around the containers being conveyed, and attaching the sleeve to the container being conveyed by a heat shrinking operation, for instance by conveying the containers through an oven. After the sleeves have been arranged around the container and before the sleeves are attached to the container by the heat shrinking operation or, in other examples, after the heat shrinking operation, the sleeves are cut by a laser or similar device so as to actually remove a surface part of the sleeve as scrap. The part of the sleeve that still covers the container is herein referred to as the "remaining sleeve part" or the "remainder" of the sleeve.

As mentioned above a part of the sleeve can be removed prior to the heat shrinking operation. However, removal of the a part of the sleeve may also be performed after the heat shrinking operation so that any disturbances of the sleeve caused by the heat shrinking operation can be removed from the container. In this case the part to be removed is present during the heat shrinking operation.

During the application of laser light on the sleeve a local melting and evaporation of the sleeve material occurs. The evaporated sleeve material forms fumes or vapours in a region close to the container. In the system disclosed in WO 2013/070088 A1 these fumes may be ventilated using an exhaust. However, in the known system the situation may occur that the fumes may eventually ignite, causing the development of flames. This may result in damage to the container, sleeve and/or the cutting apparatus. Also the accuracy of the cutting process may be deteriorated.

It is an object of the present invention to provide a method and system having a reduced risk of ignition of the fumes created by the laser cutting process.

It is a further object of the invention to provide a method and system wherein a part of the sleeve can be cut out with an improved accuracy and/or high quality cuts can be provided.

At least one of these objects may be achieved in a method for forming sleeved containers, the method comprising,
conveying a row of containers;
arranging sleeves around the containers being conveyed;
attaching the sleeve to the container being conveyed;
removing a part of the sleeve, the removing comprising at least partially laser cutting a part out of the sleeve thereby causing the creation of a fume region containing fumes of sleeve material evaporated by the laser cutting and blowing air along the wall of the container, wherein the flow of air is directed towards the fume region to force the fumes to move away from the container.

The cutting apparatus, especially the laser device thereof, can be controlled in such a manner that the flow rate and/or flow direction of the air blown along the wall of the container is sufficient to avoid ignition of the fumes generated by the laser cutting.

If the sleeve is made of heat shrinking material the attaching can be accomplished by guiding the container with sleeve through an oven heated to a suitable temperature. However, the method is also applicable to sleeves that are attached to the container in an alternative manner, for instance by gluing the sleeve to the container.

In an embodiment of the method removing the part of the sleeve comprises cutting the part out of the sleeve. Cutting the part to be removed allows separating the remaining sleeve part around the container from the removed part.

In an embodiment removing the part of the sleeve comprises at least two separate steps performed in different stages of the method. In a first step forming of the part of the sleeve to be removed is initiated. This forming can comprise partially cutting the part to be removed. Cutting can comprise forming perforation. By forming perforation the sleeve part that is to be removed is still connected to the rest of the sleeve. In a subsequent step, performed downstream the sleeve part to be removed is completely detached from the remaining part of the sleeve. This allows collecting the detached part in this step of the method.

In an embodiment at least detaching the part of the sleeve is performed after heat shrinking. During heat shrinking the part to be removed is still present and is exposed to heat shrinking. During the heat shrinking step is close to undisturbed. Still an initial step to allow removal of the sleeve part to be removed can already be performed, such as applying perforations, upstream from the heat shrinking step.

The laser cutting can be performed on the fly, that is while the sleeved container is being conveyed or when the sleeved container is temporarily stopped.

The method may further comprise sucking the mixture of fumes and air from the air flow away from the container. The sucking action improves the characteristics of the air flow along the container and thereby to reduce the risk of ignition of the fumes. The air flow is especially effective when the it is directed in axial direction along the wall of the container.

In a preferred embodiment the method comprises directing the air flow from a nozzle positioned above the container downward, preferably vertically downward, below the container. Especially when the cutting action is performed in such a manner that a (small) connecting part or strip is still present in the upper portion of the cut out sleeve part, the downward air flow reduces the risk of the cut out sleeve part to go flapping and thereby impeding the laser cutting action.

The flow rate of the air blown along the wall of the container is preferably (but not limited to) in a range between 1 litre/minute and 10 litre/minute, preferably between 1 and 5 litre/minute, and/or the flow rate of mixture of air and fumes sucked away is preferably between 5.000 litre/minute and 17.000 litre/minute.

In an embodiment removing the part of the sleeve comprises at least two consecutive steps of (i) initiating the forming of the part of the sleeve to be removed, e.g. by suitably laser cutting the sleeve, and then (ii) completely detaching the part of the sleeve, wherein at least detaching the part of the sleeve is performed after heat shrinking.

The method may involve removing a part of the sleeve by partially laser cutting the sleeve to form a cut sleeve part and then tearing the cut sleeve part away from the remainder of the sleeve. The removing (and tearing) may be performed by gripping the cut sleeve part and then pulling the cut sleeve part away from the container. This gripping can be performed by holding the cut sleeve part using air suction.

In embodiments of the present disclose there is only one air flow flowing along the outer surface of the container and the sleeve. In case of two or more air flows the air flowing from different directions may distort the flow pattern and thereby reduce the effectiveness of the removal of the laser cutting fumes.

According to another aspect at least one of the objects may be achieved in a system for forming sleeved containers comprising:
    a conveyor configured to transport a row of containers;
    a sleeve supply configured to arrange sleeves around containers;
    a cutting apparatus comprising:
        a laser device configured to at least partially laser cutting a part out of the sleeve thereby causing the creation of a fume region containing fumes of sleeve material evaporated by the laser cutting;
        an air flow unit configured to blow air along the wall of a container, wherein the air flow unit is further configured to direct the air flow towards the fume region so as to force the fumes to move away from the container.

The air flow unit may be configured to supply air with a flow rate and/or flow direction sufficient to avoid ignition of the fumes generated by the laser cutting.

In an embodiment the air flow unit comprises an air flow supply conduit for supplying fresh air from the environment and a fan with a nozzle for discharging the supplied air in a suitable direction towards the fume region.

In an embodiment the system comprises a fume discharge unit configured to receive the mixture of air from the air flow unit and the fumes generated by the laser cutting action and to discharge the mixture. The fume discharge unit may comprise an inlet and a fan configured to suck the mixture through the inlet.

In a further embodiment the air flow unit is configured to supply the air flow in axial direction along the wall of the container, for instance in a vertical upward or downward direction. The air flow unit may be configured to supply the air flow from a nozzle located at a position above the container in a downward direction, preferably to an inlet positioned below the container.

The laser device may comprises a control device for directing a laser beam onto the sleeve around the container being conveyed in a pattern in accordance with the part of the sleeve to be removed. In other words, the laser device may be controlled so as to allow movement of the laser beam over the sleeve to cut the sleeve material along a predetermined trajectory, wherein the trajectory is such that a strip of sleeve material remains uncut to keep the cut sleeve part connected to the remainder of the sleeve. The cutting apparatus may be configured to cut the sleeve to create a strip located at the upper portion of the cut sleeve part, preferably at its uppermost portion. When the sleeve is partially cut by the laser to form a cut sleeve part that is connected via a strip with the remainder of the sleeve, the cut sleeve part may be fully released from the sleeve by tearing the cut sleeve part away from the remainder of the sleeve. To this end the system may comprise a gripping unit configured to grip the cut sleeve part and then pull the cut sleeve part away from the container.

Any of the methods/devices disclosed herein according to any of the aspects can be combined with any of the implicit/explicit features disclosed herein.

Now the invention will be disclosed in more detail referring to the drawings showing embodiments of the invention. The shown embodiments do not limit the scope of protection of the invention but illustrate examples thereof. It will be clear to a person skilled in the art that features mentioned in the embodiments illustrate preferred embodiments, but can be replaced by other less preferred features. A skilled person will be able to generalize the examples as provided and these examples are also part of this disclosure and divisional applications could be directed at these explicit or implicit or generalized features.

THE DRAWINGS SHOW

Figure 2C:
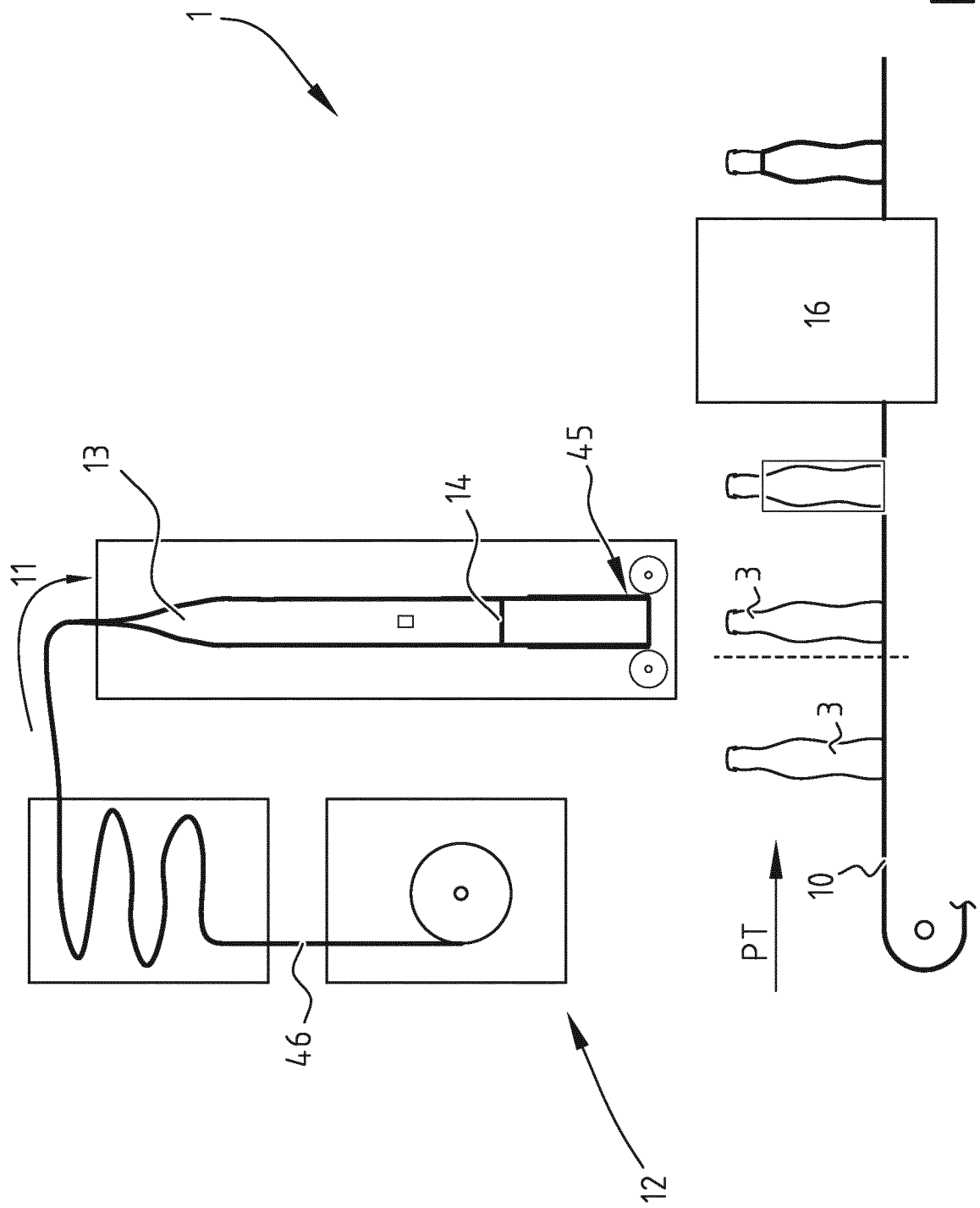
Figure 4:
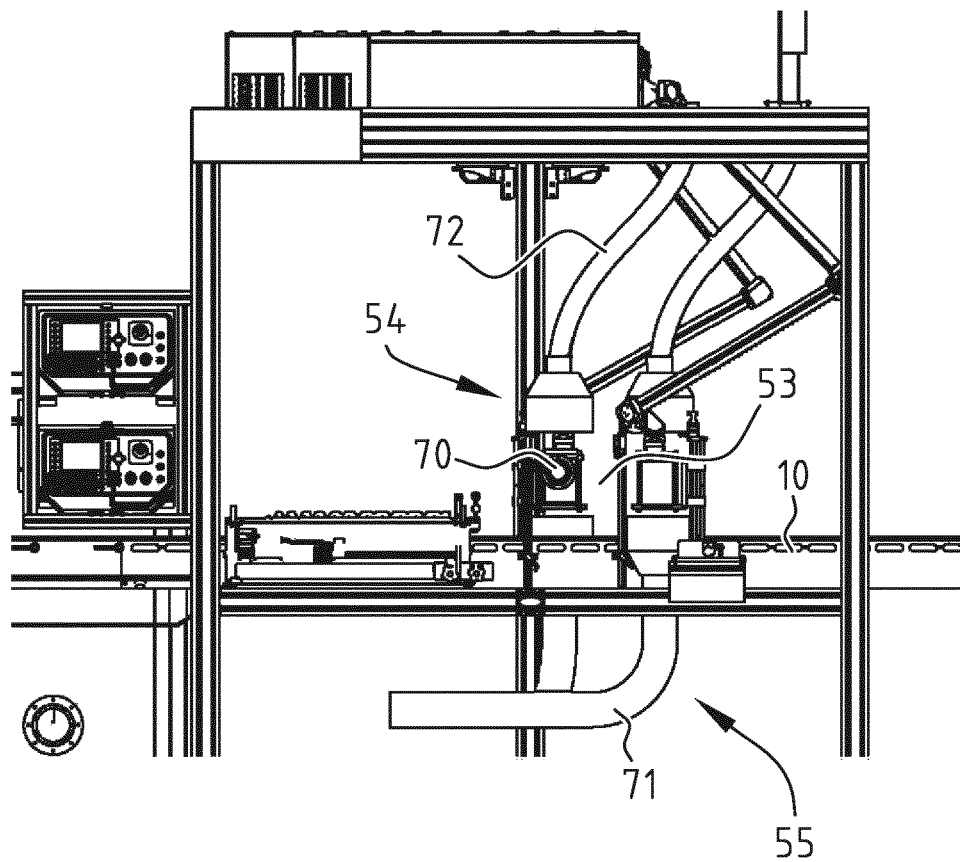
Figure 5:
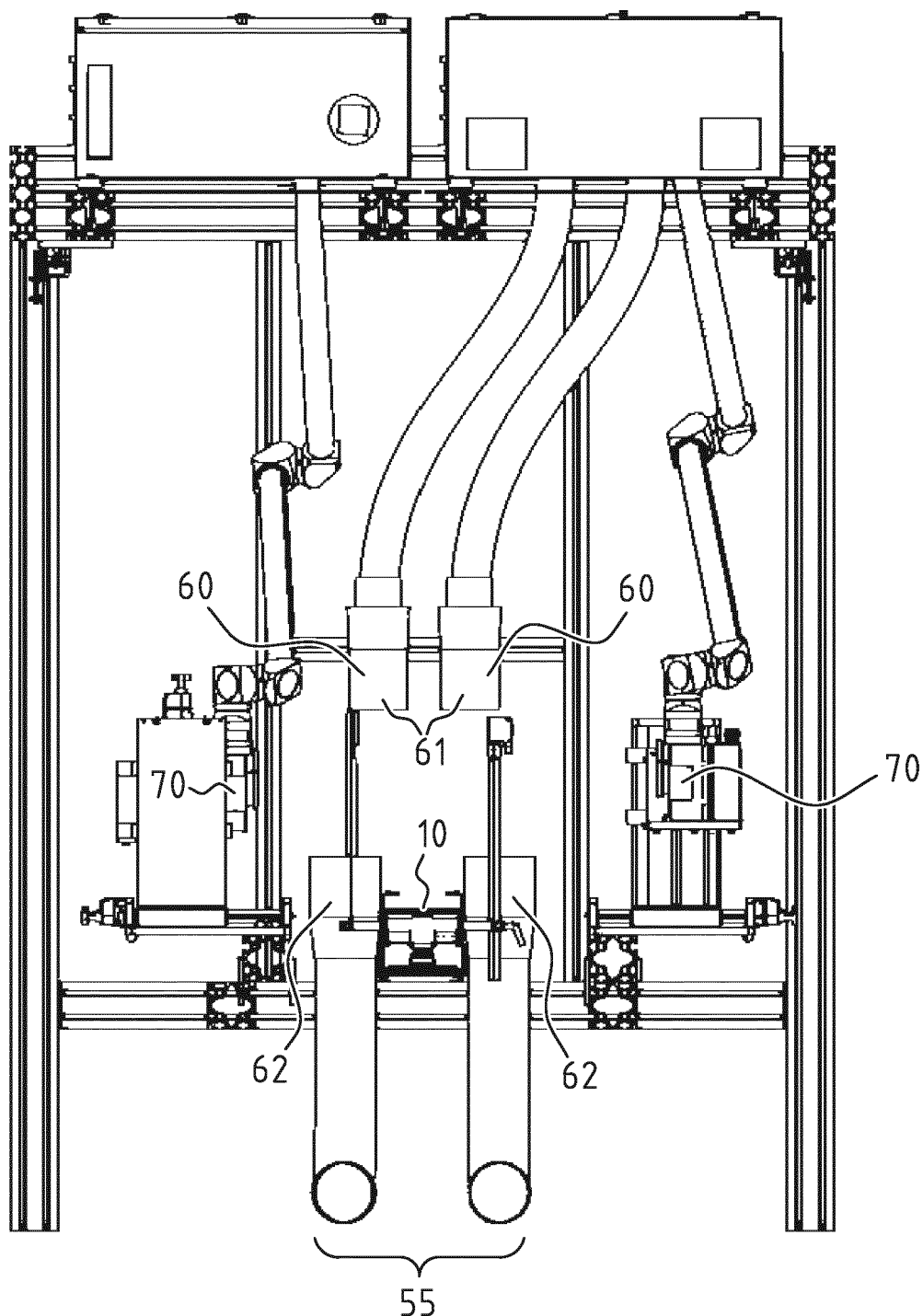

FIG. 1 a schematic view of an embodiment of a sleeving system comprising a cutting apparatus in accordance with an embodiment of the present invention;

FIG. 2A a more detailed side view of an embodiment of a cutting apparatus of FIG. 1;

FIG. 2B a more detailed top view of the embodiment of FIG. 2A;

FIG. 2C a more detailed view of the sleeve supply of the sleeving system of FIG. 1;

FIGS. 3A-3D schematic views of different phases in the laser cutting process and the generation of fumes (vapours);

FIGS. 4 and 5 a side view and front view of a further embodiment of a system for forming sleeved containers.

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

FIGS. 1, 2A-2C schematically show a portion of a sleeving system 1 for arranging labels or sleeves around a plurality of containers 3, for instance bottles or cans, and for respectively removing one or more pieces of foil forming a label or sleeve 2 arranged around the containers. The containers 3 may be empty, but usually they have been pre-filled with foodstuff such as a beverage, cleaning agents such as a granulate laundry detergent, or similar content. The invention is not limited by this content or by the shape and size of the container. Container 3 may be a closed container, such as a container closed by a lid 4.

For instance, sleeve 2 may have a decorative function or arranged to display useful information regarding the content of the container 3. It can contain trademark indications, content indications and other graphics for recognition of the potential buyer of the container. Containers 3 with sleeves 2 are provided to wholesale stores, grocery stores and are sold in packs or sold separately.

The sleeving system 1 may be system wherein the sleeves are moved in a downward direction to slide the sleeve over the upper part of the container until the sleeve reaches a suitable target position on the container. An example of such system is described in WO 2013/0793937 A1, the content of which is herein incorporated by reference. This sleeving system comprises a conveyor for transporting containers and a sleeve supply for arranging sleeves around the containers transported by the conveyor. The sleeve supply comprises a foil feeding unit for feeding foil, a mandrel for opening the foil, a cutting unit for cutting a sleeve from the foil and a sleeve discharge unit for causing the sleeve to move towards a container passing by on the conveyor.

The sleeving system may also be a system wherein the sleeves are moved in upward direction to slide the sleeve over the lower part of the container until it reaches a suitable target position on the container. An example of such system is described in WO 2014/006033 A1, the content of which is herein incorporated by reference as well. This type of sleeving system also comprises a conveyor for transporting containers and a sleeve supply for arranging heat shrinkable sleeves around containers transported by the conveyor, wherein the sleeve supply comprises a foil feeding unit for feeding foil, a mandrel for opening the foil, and a cutting unit for cutting a sleeve from the foil. The sleeve supply further comprises an ejection unit for ejecting the sleeve from the mandrel upwardly in substantially the opposite direction of the gravitational force to a position around the container.

As shown in FIG. 2A, the container 3 is arranged to define an axial direction 6 and a circumferential direction 7. Generally it will be possible to recognize the axial direction 6 as the upward direction and the circumferential direction 7 as the direction along the peripheral wall 8 of the container. The sleeve 2 is generally positioned on this wall 8 of the container 3. However, alternative positions of the sleeve are also possible.

The sleeving system 1 comprises a conveyor 10 configured to transport containers and a sleeve supply 11 configured to arrange heat shrinkable sleeves around containers. The sleeve supply 11 comprises a foil feeding unit 12 configured to supply (flattened tubular) foil 46, a mandrel 13 configured to open the foil received from the foil feeding unit into a tubular shape, a cutting unit 14 configured to cut individual sleeves from the foil opened by the mandrel 15 and a sleeving device 45, for instance the above-described sleeve discharge unit or ejection unit, configured to transport the sleeves upwardly or downwardly to arrange them on the containers.

Furthermore, the system comprises an oven 16 arranged downstream of the sleeve supply 11. The oven 16 is configured to heat the sleeve arranged around a container to such an extent that the sleeve is shrunk around the container in order to attach it firmly to the container. The system 1 may comprise further handling stations, for instance a drying unit wherein a sleeved containers may be dried such that liquid droplets are removed or a discharge conveyor at a downstream end of the conveyor 10 that takes care of the further discharge of the containers. More specifically, in the embodiment of FIG. 1, a sleeved container 3' is transported to the oven 16. In the oven the sleeve will be heated to shrink by, such as heated steam vapor, resulting in attaching the sleeve around the container. The container is now a labelled container 3". In a further downstream station 50 the labelled container is dried to remove water droplets. Station 51 is a schematic representation of the system as shown in FIGS. 2A and 2B for cutting the sleeves and removing the cut part of the sleeves from the containers 1 to produce a container 3''' having a cut sleeve or label.

Containers 3 are provided near the upstream end of the conveyor 10 and are transported by conveyor 5 in direction $P_T$. Guides 15 (FIG. 2A) are positioned on both sides of the conveyor 10 in a V-shape/funnel shape so as to direct the containers to the center of the conveyor 10. In the embodiment shown in FIG. 2A the containers 3 are positioned centrally along the longitudinal axis of conveyor 10. The guides 15 are positioned such that a space in between is exactly enough to allow passage of container 3 in the conveyor direction $P_T$. The containers 3 are transported along a sensor 19 (FIG. 2A). Sensor 19 is configured to detect the presence of a container passing by on the conveyor 10. Detection of the presence of a container results in transmission of a trigger signal 29 (FIG. 2B) to a laser device control unit 30. The laser device control unit 30 is connected to a laser device 33 arranged sideways of the conveyor 10.

In another embodiment sensor 19 is arranged to capture an image. Sensor 19 (for instance a CCD camera or similar device) can be connected to the control unit 30 that is configured to compare a captured image with a memorized picture. Based on the comparison the timing of the containers passing by the sensor is determined. Trigger signal 29 triggered by arrival of a distal end of container 3 in front of sensor 19, in combination with a predetermined or detected conveyor speed (i.e. the transport speed of the containers), allows the laser device 33 or the laser device control unit 30 to calculate the arrival time of the container 2 at a position right in front of the laser device 33 or, more specifically, the arrival time of the container at a position within an operating window 25 of the laser spot generated by the laser device 33. The conveyor speed 28 is in an embodiment at least 1 m/s or at least 5 m/s. The trigger sensor 19, in particular in combination with the guides 15, results in specific knowledge of the position of the container 3 when moved by conveyor 10 and allows synchronizing downstream applications with the arrival of labeled containers 3.

The operating window 25 of laser device 33 is the window within which the laser spot 31 can operate on the sleeve 2. The laser spot 31 is directed by e.g. reflectors present within the laser device 33. As the area of focus of the laser device is limited as well as the angle of the reflectors, the laser spot is applied to the sleeve 2 within a limited window of operation.

Laser device 33 is schematically shown in FIGS. 2A and 2B. The laser device 33 is connected to an energy source and can be connected to or can comprise a laser device control unit 30. Laser device control unit 30 is programmed to configure e.g. the power of the laser beam, the direction of the laser beam and the on/off-timing of the laser beam. In an embodiment laser device control unit 30 comprises a memory 32. Memory 32 can be any type of memory, for instance an external or internal memory, and is suitable for storing a computer program defining a path (pattern or trajectory) the laser beam needs to follow in order to properly cut the sleeve. The laser beam can be focused such that laser beam spot 31 is focussed on a distance 47 substantially equal to the distance between the tip of laser device 33 and the surface 34 of sleeve 2 around container 3.

In an embodiment transport of the container 3 on the conveyor is temporarily stopped when the container has reached the position of the laser device 33 so that the laser may cut the sleeve while the container is stationary. In other embodiments the container 3 is still moving during the cutting process. In these embodiments the path 35 is corrected for the speed (velocity V, 36, FIG. 2A) of conveyor 10 in direction $P_T$. A skilled person will be able to configure a cutting path 35 that will cut a part 37 in sleeve 2 in a suitable shape while the container is in motion.

Due to a difference in thickness of material used for the container 3 and label 2 and as a result of a suitable control of laser parameters such as power and timing, the laser device 33 is able to cut a suitable shaped part 37 from the sleeve with a minimum damage to the container 3 and to the remainder 38 of the sleeve, even when container 3 is formed from a similar plastic material as the sleeve. When the container is made of a similar material as the sleeve, the wall of the container is made thicker than the thickness of the sleeve. The laser beam is caused to melt and thereby cut the sleeve essentially without melting the container wall.

Laser device 33 can be any suitable type of laser, for instance a 60 W, 10200 nm CO2 laser with fixed focus or can be an automatic focus laser device. Other types of lasers can be used as well. The laser device 33 may be an infrared or far-infrared laser, may comprise multiple laser beams or multiple lasers.

Cut part 37 is formed as a result of cutting the label or sleeve 2. The cut part can have any shape. For instance, the cut part 37 may be formed entirely within the sleeve 2, formed near an edge of the sleeve, etc. In embodiments of the invention sleeve is only partially cut. After cutting the cut part 37 of the sleeve (i.e. the cut sleeve part) is still connected to the remainder 38 of the sleeve. In other words, the cut sleeve part is not cut along its entire circumference. A small portion of sleeve material (i.e. a chad) remains uncut so that the cut sleeve part 37 remains connected to the remainder 38 of the sleeve. One or more connections formed by small strips or chads of sleeve material between the cut part 37 and the remainder 38 of the sleeve part of the sleeve are arranged at any position along the circumference of the cut part 37. In preferred embodiments it is advantageous to locate the connection (for instance strip 40) at the upper portion of the cut sleeve part 37, for instance at its uppermost portion, as will be discussed hereafter.

The station 51 comprising the laser device 33 also comprises an air suction unit 52. The air suction unit has an inlet 52 and means for generating a local under pressure at a position close to the passage of part 37 when the container 3 is transported further downstream. The local under pressure will result in tearing the remaining connection (strip 40) so that the cut part 37 becomes fully separated from the remainder 38 of the sleeve that is still attached to the container. Once released from the container and the remainder of the sleeve the cut part 37' is sucked away from the conveyor and is transported to be collected for disposal. After removal of cut part 37, a container 3''' having a sleeve 2' without a part 37 is obtained.

During the application of laser light on the sleeve a local melting and evaporation of the sleeve material occurs. The evaporated sleeve material forms fumes or vapours 39 in the direct environment of the container. In the system disclosed in WO 2013/070088 A1, these fumes may be ventilated using an exhaust (exhaust 40 in FIG. 1A of WO 2013/070088 A1) having an entrance above position where the laser cuts the sleeve. The fumes are collected in a filter or can be released at a safe location, e.g. outside the plant.

Figure 3A:
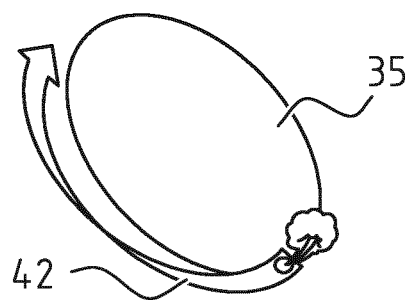
Figure 3B:
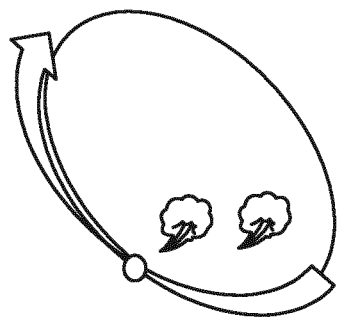
Figure 3C:
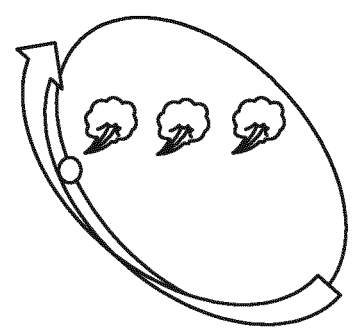
Figure 3D:
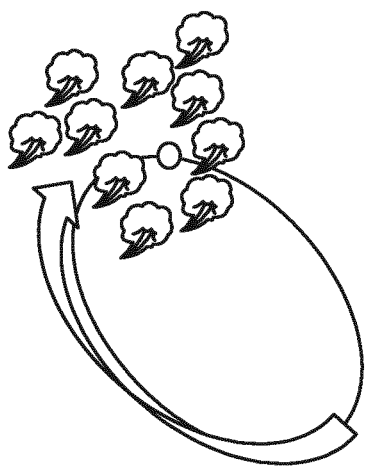

In the example of WO 2013/070088 A1 the fumes are sucked in the upward direction. When the laser beam moves in the same direction during the cutting operation, the fumes may eventually ignite, causing the development of flames. This may result in damage to the container, sleeve and/or the cutting apparatus. This phenomenon is elucidated in FIGS. 3A-3D. FIGS. 3A-3D represent the various phases occurring during the laser cutting operation. The laser device 33 is controlled so as to apply the laser beam onto a starting position on the sleeve attached to the container (FIG. 3A). This results in the generation of fumes 39. As the spot 31 of the laser beam moves forward along the trajectory where the sleeve needs to be cut more fumes are created (FIG. 3B). As the laser spot moves further along the trajectory in the direction of the arrow 42 even more fumes are created and the laser beam may start to move into the region where the fumes 39 are present. When this happens, the fumes may ignite causing flames to occur (FIG. 3C). When this situation continues, a heavy burning may take place and flames may even be sucked in by the exhaust (FIG. 3D). When the laser beam continues its journey along the trajectory 35 to be cut and moves in a downward direction, the laser beam starts to remove itself from the region of the fumes. The fire becomes smaller and eventually fades out.

In order to reduce this phenomenon or even avoid it altogether, the cutting apparatus of the station 50 comprises one or more air flow discharge units 54 for generating one or more airflows towards the region 53 where the fumes 39 are present. The cutting apparatus also comprises one or more fume discharge units 55 for receiving the fumes and discharging them to a position away from the station 50.

FIGS. 4 and 5 are a more detailed view of the station 50 provided with a cutting apparatus provided with air flow discharge units 54 and fume discharge units 55. In the drawings an air flow unit 54 is arranged at both sides of the conveyor 10 so that the fumes may be removed at both sides of the container. In another embodiment only one air flow unit 54 is arranged sideways of the conveyor 10. In still other embodiments more than two air flow discharge units are provided, with one or more discharge units arranged at each side of the conveyor.

An air flow unit 54 may comprise an air supply tube 72 and an air flow supply conduit 60 for supplying fresh air from the environment, and a blower with a nozzle 61 for discharging the air supplied by the air supply tube 82 and the air flow supply conduit 60 in a suitable direction, i.e. towards the fume region 53. In the embodiment of FIGS. 4 and 5 the air flow unit(s) 54 is located above (i.e. at a greater height) the upper part of the container and the air flow is directed in a generally downward direction. Although this arrangement may have advantages, other arrangements are also possible, for instance arrangements wherein the nozzles are positioned such that the air flow is directed in an obliquely downward direction, for instance with an angle α between the axial direction 6 and the direction of the air flow between 1 and 45 degrees.

The fume discharge units 55 are positioned at a lower position, for instance at a height position below the container, so as to be able to receive the air from the air flow units 54 together with the fumes 39 generated by the laser cutting action. In the embodiment of FIGS. 5 and 6 the inlets 62 of the fume discharge units 55 are positioned sideways of the conveyor 10 and at a position slightly below the upper part of the conveyor (for instance the upper belt in case of a conveyor of the endless conveyor belt type). However, any other position of the inlets is possible as well as long as the fume discharge units 55 are able to properly receive the air/fume mixture and discharge the same.

In embodiments of the invention only the air flow unit 54 is provided with means to generate a forced air flow (i.e. a blower or similar device). In other embodiments both the air flow unit 54 and the fume discharge unit 55 are provided with such means for generating a forced flow: the air flow unit 54 may be provided with one or more blowers (such as electric fans or ventilators) to generate a forced air flow towards the fume region and the fume discharge unit 55 may be provided with one or more blowers (fans, ventilators) to suck away the air/fume mixture blown towards its inlet 62 by the air flow unit 54.

The air flow directed by the air flow unit 54 to the fume region 53 and, in embodiments with active suction by the fume discharge unit 55, the air flow sucked in through the inlet 62 and the discharge tube 71 is controlled in such a manner that the fumes generated by the cutting action are removed to a sufficient extent so that no ignition of the fumes takes place.

Increasing the air speed of the air flow from the air flow unit(s) 54 does not only remove away the fumes but it may also cause movement of the cut part 37 during the cutting action. Depending on the air speed and/or the arrangement of the outlets (nozzles) and inlets of the air flow unit(s) 54 and fume discharge unit (s) 55 the cut sleeve part may be folded. This may cause the laser beam to cut through two or more parts of the sleeves. In some case the laser may not be powerful enough and/or the laser timing will not be long enough to cut through these two or more parts so that the cutting quality may deteriorate. In order to avoid this situation a contra-flow of the air flow from the air flow unit 54, i.e. a flow having a flow direction that causes the cut sleeve part to flip over, should be avoided. For instance, when the earlier mentioned strips or chads 40 are formed at an upper portion of the sleeve, the flow unit(s) 54/fume discharge unit(s) 55 should cooperate to cause an air flow in a generally downward direction. When the earlier mentioned strips or chads 40 are formed at a lower portion of the sleeve, the flow unit(s) 54/fume discharge unit(s) 55 should cooperate to cause an air flow in a generally upward direction. In this manner the cut-out (i.e. the part 37) can be better kept in place during the laser cutting action, with a reduced risk of folding and thereby a high quality cutting action is ensured.

FIGS. 4 and 5 further show suction elements 70 that allow gripping of partially cut-out parts 37 of the sleeve. Each suction element 70 is configured to move the gripped part 37 of a sleeve away from the associated container and thereby tearing this part 37 off of the remainder of the sleeve. Different solutions for gripping the cut parts 37 and moving them away from the containers are conceivable as well.

As will be apparent to those of skill in the art upon reading this disclosure, each of the individual embodiments described and illustrated herein has discrete components and features which may be readily separated from or combined with the features of any of the other several embodiments without departing from the scope of the present invention. Any recited method can be carried out in the order of events recited or in any other order which is logically possible.

In a further embodiment the direction of the air flow may be changed, for instance during the laser cutting operation of a container and/or in the time intervals between the laser cutting of consecutive containers, for instance during movement of the containers on the conveyor. The air flow unit and/or the fume discharge unit may be configured to be movable with respect to the conveyor with containers so as to control the direction of the air flow along the wall of the container with respect to the transport direction of the containers. This makes it possible to steer the air flow and to change the direction of the air flowing along the sleeve, for instance to avoid any flipping over of the sleeve after the label has been partially cut.

It is to be understood that this invention is not limited to particular aspects described, and, as such, may vary. It is also to be understood that the terminology used herein is for the purpose of describing particular aspects only, and is not intended to be limiting, since the scope of the present invention will be limited only by the appended claims.

The invention claimed is:

1. A method for forming sleeved containers, the method comprising:
  conveying a row of containers;
  arranging sleeves around the containers being conveyed;
  attaching the sleeve to the container being conveyed, preferably by heat shrinking;
  removing a part of the attached sleeve, the removing comprising:
    at least partially laser cutting a part out of the sleeve thereby causing the creation of a fume region containing fumes of sleeve material evaporated by the laser cutting, wherein the laser cutting includes moving a laser beam over the sleeve to cut the sleeve material along a predetermined trajectory, and wherein the trajectory is such that a strip of sleeve material remains uncut to keep the cut portion of the sleeve connected to the remainder of the sleeve;
    blowing air along the wall of the container, wherein the flow of air is directed towards the fume region to force the fumes to move away from the container, wherein a flow rate of the air blown along the wall of the container is between 1 l/min and 10 l/min, inclusive, and wherein the flow rate of the air does not cause movement of the cut portion; and
  directing the air flow such that the air first reaches the uncut strip of sleeve material and then move further along the sleeve.

2. The method of claim 1, comprising additionally sucking the mixture of fumes and air from the air flow away from the container and/or comprising directing the air flow in axial direction along the wall of the container, parallel to the side wall of the container.

3. The method as claimed in claim 1, comprising directing the air flow from a nozzle positioned above the container downward, preferably to an inlet positioned below the container and/or comprising directing the air flow essentially vertically downward.

4. The method as claimed in claim 1, wherein the flow rate and/or flow direction of the air blown along the wall of the container is sufficient to avoid ignition of the fumes generated by the laser cutting.

5. The method as claimed in claim 1, wherein the flow rate of the air blown along the wall of the container is between 1 and 5 l/min and/or wherein the flow rate of mixture of air and fumes sucked away is between 5.000 l/min and 17.000 l/min.

6. The method as claimed in claim 1, wherein removing the part of the sleeve comprises at least two consecutive steps of (i) initiating the forming of the part of the sleeve to be removed and (ii) completely detaching the part of the sleeve, wherein at least detaching the part of the sleeve is performed after heat shrinking.

7. The method as claimed in claim 1, wherein the strip is preferably located at the upper portion of the cut sleeve part.

8. The method as claimed in claim 4, wherein removing a part of the sleeve comprises partially laser cutting the sleeve to form a cut sleeve part and then tearing the cut sleeve part away from the remainder of the sleeve.

9. The method as claimed in claim 1, wherein removing the part of the sleeve comprises gripping the cut sleeve part and then pulling the cut sleeve part away from the container, wherein gripping the cut sleeve part preferably comprises holding the cut sleeve part using air suction and/or comprising changing the direction of the air flow during laser cutting and/or changing the direction of the air flow between laser cutting of consecutive containers.

10. The method as claimed in claim 1, comprising detecting the passage of a conveyed container along a sensor and triggering the laser cutting based on the timing of the detected container.

11. A system for forming sleeved containers comprising:
a conveyor configured to transport a row of containers;
a sleeve supply configured to arrange sleeves around containers;
a cutting apparatus comprising:
  a laser device configured to at least partially laser cutting a part out of the sleeve thereby causing the creation of a fume region containing fumes of sleeve material evaporated by the laser cutting, wherein the laser cutting includes moving a laser beam over the sleeve to cut the sleeve material along a predetermined trajectory, and wherein the trajectory is such that a strip of sleeve material remains uncut to keep the cut portion of the sleeve connected to the remainder of the sleeve; and
  an air flow unit configured to blow air along the wall of a container, wherein the air flow unit is further configured to direct the air flow towards the fume region so as to force the fumes to move away from the container, and wherein the airflow is directed flow such that the air first reaches the uncut strip of sleeve material and then move further along the sleeve, wherein the air flow unit is configured to supply air with a flow rate or a flow direction sufficient to avoid ignition of the fumes generated by the laser cutting tool, wherein the air flow unit is configured to provide a flow rate of the air blown along the wall of the container between 1 l/min and 10 l/min, inclusive, and wherein the flow rate of the air does not cause movement of the cut portion.

12. The system as claimed in claim 11, wherein the air flow unit comprises an air flow supply conduit for supplying fresh air from the environment and a fan with a nozzle for discharging the supplied air in a suitable direction towards the fume region.

13. System The system as claimed in claim 11, comprising a fume discharge unit, preferably at a position opposite the position of the air flow unit, configured to receive the mixture of air from the air flow unit and the fumes generated by the laser cutting action and to discharge the mixture, wherein the fume discharge unit preferably comprises an inlet and a fan configured to suck the mixture through the inlet.

14. The system as claimed in claim 11, wherein the air flow unit is configured to supply the air flow in axial direction along the wall of the container and/or wherein the air flow unit is configured to supply the air flow from a nozzle located at a position above the container in a downward direction, preferably to an inlet positioned below the container.

15. The system as claimed in claim 11, wherein the air flow unit is configured to provide a flow rate of the air blown along the wall of the container between 1 and 5 l/min; and/or wherein the flow rate of mixture of air and fumes sucked away is between 5.000 l/min and 17.000 l/min.

16. The system as claimed in claim 11, wherein the cutting apparatus is configured to cut the sleeve to create the strip located at the upper portion of the cut sleeve part, preferably at its uppermost portion and/or wherein optionally the cutting apparatus is configured to partially laser-cut the sleeve to form a cut sleeve part and then tearing the cut sleeve part away from the remainder of the sleeve.

17. The system as claimed in claim 11, comprising a gripping unit configured to grip the cut sleeve part and then pulling the cut sleeve part away from the container, wherein the gripping unit preferably comprises an air suction member.

18. The system as claimed in claim 11, comprising a sensor configured to detect the passage of a conveyed container along a sensor and trigger the laser cutting based on the timing of the detected container.

19. The system as claimed in claim 11, wherein the sleeve is made of heat shrinking material, the system comprising a heat oven configured to attach the sleeve around the container by heat shrinking, the conveyor arranged through the heat oven downstream from the sleeve supply.

20. The system according to claim 11, wherein the laser device comprises a control device for directing a laser beam onto the sleeve around the container being conveyed in a pattern in accordance with the part of the sleeve to be removed and/or wherein the air flow unit and/or the fume discharge unit are movable with respect to the conveyor with containers so as to control the direction of the air flow along the wall of the container with respect to the transport direction of the containers.

* * * * *